US012695606B2

(12) United States Patent  
Leoutsarakos

(10) Patent No.: US 12,695,606 B2  
(45) Date of Patent: Jul. 28, 2026

(54) FAULT-TOLERANT ACCESS TO DIGITAL ASSETS WITHOUT STORING SENSITIVE SECURITY DATA FOR DECRYPTION

(71) Applicant: Nicolas Leoutsarakos, Montreal (CA)

(72) Inventor: Nicolas Leoutsarakos, Montreal (CA)

( * ) Notice: Subject to any disclaimer, the term of this patent is extended or adjusted under 35 U.S.C. 154(b) by 249 days.

(21) Appl. No.: 18/209,001

(22) Filed: Jun. 13, 2023

(65) Prior Publication Data

US 2024/0163088 A1 May 16, 2024

Related U.S. Application Data

(63) Continuation-in-part of application No. 17/988,614, filed on Nov. 16, 2022, now abandoned.

(51) Int. Cl.  
*H04L 9/08* (2006.01)  
*H04L 9/30* (2006.01)

(52) U.S. Cl.  
CPC .......... *H04L 9/0861* (2013.01); *H04L 9/0894* (2013.01); *H04L 9/3026* (2013.01)

(58) Field of Classification Search  
CPC .... H04L 9/0861; H04L 9/0894; H04L 9/3026  
See application file for complete search history.

(56) References Cited

U.S. PATENT DOCUMENTS 9,621,342 B2 * 4/2017 Jakobsson ............. H04L 9/0866  
10,432,409 B2 * 10/2019 Wallrabenstein ..... H04L 9/3066

| | | | |
|---|---|---|---|
| 2002/0087865 A1 * | 7/2002 | Eskicioglu | H04L 9/3242 |
| | | | 713/168 |
| 2003/0219121 A1 | 11/2003 | van Someren | |
| 2004/0111625 A1 | 6/2004 | Duffy | |
| 2009/0310779 A1 * | 12/2009 | Lam | H04L 9/3231 |
| | | | 380/46 |
| 2015/0098566 A1 * | 4/2015 | Takashima | H04L 9/0861 |
| | | | 380/44 |
| 2020/0285720 A1 * | 9/2020 | Alsolami | G06V 40/1353 |
| 2021/0194686 A1 * | 6/2021 | Grass | G16B 20/00 |
| 2021/0374445 A1 * | 12/2021 | Genner | G06V 40/45 |
| 2022/0188393 A1 | 6/2022 | Forte | |
| 2022/0405369 A1 | 12/2022 | Takahashi | |

\* cited by examiner

*Primary Examiner* — Rupal Dharia  
*Assistant Examiner* — Devin E Almeida  
(74) *Attorney, Agent, or Firm* — Law Office of Dorian Cartwright; Dorian Cartwright

(57) ABSTRACT

An encryption key is created, and sensitive security data is sourced from it and from live data collected in real-time from a user context by a group functions. Subsequently, indicators to functions are stored and the encryption key with the sensitive security data is deleted. Redundancy is provided so that the decryption key can be created from different combinations of functions. A decryption key is later generated with sensitive security data using one or more stored indicators of the one or more functions to obtain an instance of live data in real-time from a current user context. Failing to generate the correct decryption key will result in repeating the creation of the decryption key with different groups of functions until access is granted or combinations of redundant stored functions are exhausted.

17 Claims, 12 Drawing Sheets

300

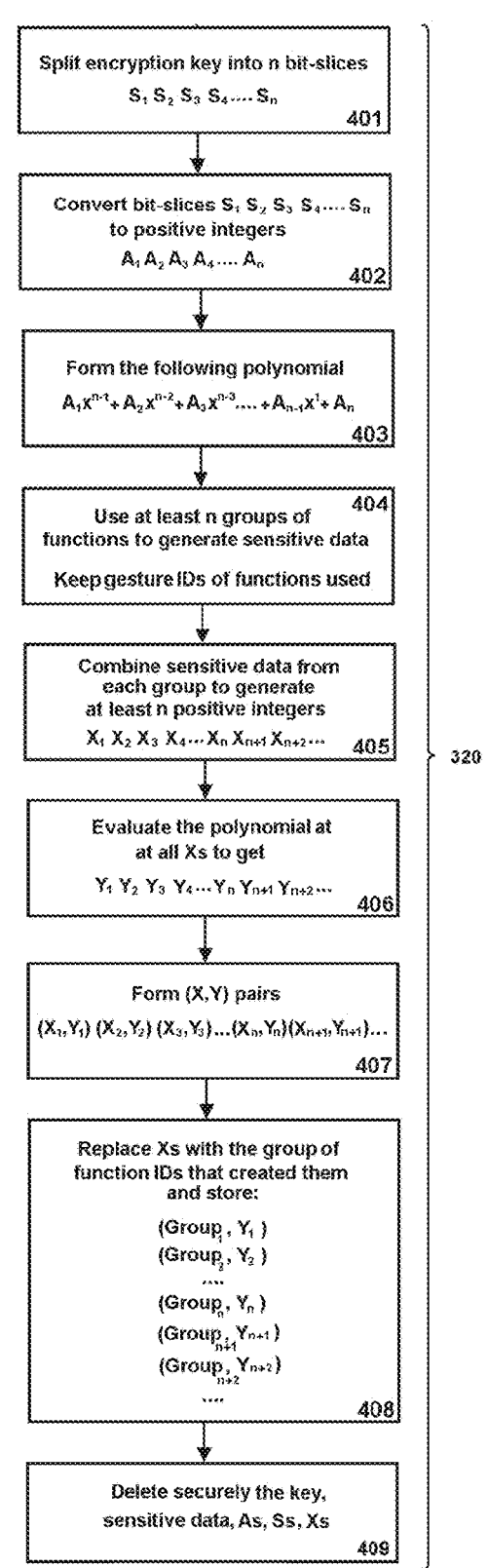

Split encryption key into n bit-slices
$S_1 \ S_2 \ S_3 \ S_4 \dots S_n$
401

Convert bit-slices $S_1 \ S_2 \ S_3 \ S_4 \dots S_n$
to positive integers
$A_1 \ A_2 \ A_3 \ A_4 \dots A_n$
402

Form the following polynomial
$A_1 x^{n-1} + A_2 x^{n-2} + A_3 x^{n-3} \dots + A_{n-1} x^1 + A_n$
403

404
Use at least n groups of
functions to generate sensitive data

Keep gesture IDs of functions used

Combine sensitive data from
each group to generate
at least n positive integers
$X_1 \ X_2 \ X_3 \ X_4 \dots X_n \ X_{n+1} \ X_{n+2} \dots$     405

Evaluate the polynomial at
at all Xs to get
$Y_1 \ Y_2 \ Y_3 \ Y_4 \dots Y_n \ Y_{n+1} \ Y_{n+2} \dots$
406

Form (X,Y) pairs
$(X_1,Y_1) \ (X_2,Y_2) \ (X_3,Y_3) \dots (X_n,Y_n)(X_{n+1},Y_{n+1}) \dots$
407

Replace Xs with the group of
function IDs that created them
and store:

$(Group_1, Y_1)$
$(Group_2, Y_2)$
....
$(Group_n, Y_n)$
$(Group_{n+1}, Y_{n+1})$
$(Group_{n+2}, Y_{n+2})$
....     408

Delete securely the key,
sensitive data, As, Ss, Xs
409

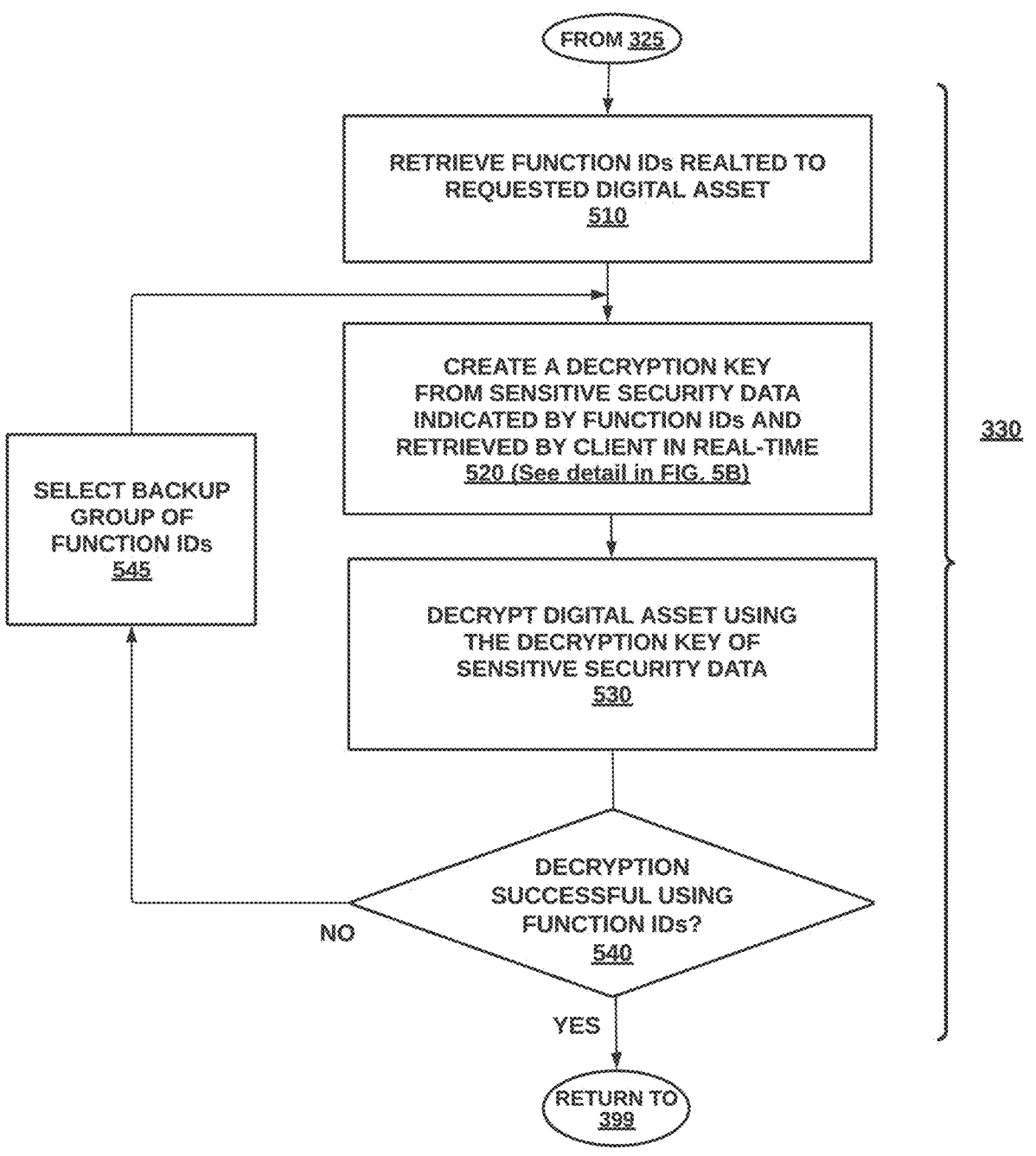

FROM 325

RETRIEVE FUNCTION IDs REALTED TO
REQUESTED DIGITAL ASSET
510

CREATE A DECRYPTION KEY
FROM SENSITIVE SECURITY DATA
INDICATED BY FUNCTION IDs AND
RETRIEVED BY CLIENT IN REAL-TIME
520 (See detail in FIG. 5B)

SELECT BACKUP
GROUP OF
FUNCTION IDs
545

DECRYPT DIGITAL ASSET USING
THE DECRYPTION KEY OF
SENSITIVE SECURITY DATA
530

DECRYPTION
SUCCESSFUL USING
FUNCTION IDs?
540

NO

YES

330

RETURN TO
399

FIG. 5A

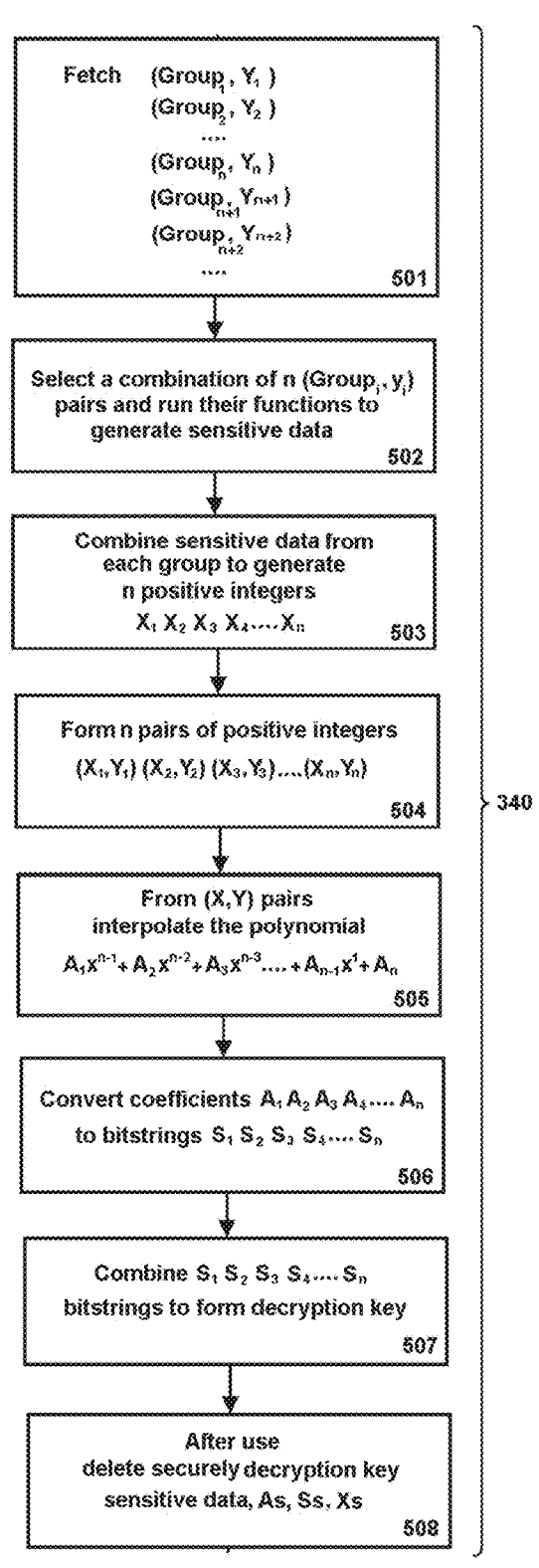

Fetch    (Group$_1$, Y$_1$)
(Group$_2$, Y$_2$)
....
(Group$_n$, Y$_n$)
(Group$_{n+1}$, Y$_{n+1}$)
(Group$_{n+2}$, Y$_{n+2}$)
....     501

Select a combination of n (Group$_i$, y$_i$)
pairs and run their functions to
generate sensitive data     502

Combine sensitive data from
each group to generate
n positive integers
X$_1$ X$_2$ X$_3$ X$_4$....X$_n$     503

Form n pairs of positive integers
(X$_1$,Y$_1$) (X$_2$,Y$_2$) (X$_3$,Y$_3$)....(X$_n$,Y$_n$)     504

From (X,Y) pairs
interpolate the polynomial
$A_1x^{n-1} + A_2x^{n-2} + A_3x^{n-3}.... + A_{n-1}x^1 + A_n$     505

Convert coefficients A$_1$ A$_2$ A$_3$ A$_4$.... A$_n$
to bitstrings S$_1$ S$_2$ S$_3$ S$_4$.... S$_n$     506

Combine S$_1$ S$_2$ S$_3$ S$_4$.... S$_n$
bitstrings to form decryption key     507

After use
delete securely decryption key
sensitive data, As, Ss, Xs     508

340 bitstrings to form

*FIG. 5A1*

FAULT-TOLERANT ACCESS TO DIGITAL ASSETS WITHOUT STORING SENSITIVE SECURITY DATA FOR DECRYPTION

CROSS-REFERENCE TO RELATED APPLICATIONS

The present application is related as a continuation-in-part to U.S. patent application Ser. No. 17/988,614, by the same inventor, the contents of which are hereby incorporated by reference in its entirety.

FIELD OF THE INVENTION

The invention relates generally to digital assets and security of digital assets, and more specifically, for encrypting access to digital assets, with live data redundancy without storing keys and other sensitive security data for decryption and access.

BACKGROUND

Standard algorithms that protect digital assets use a single key or a private-public key pair for encrypting and decrypting files, photos, documents, logins, and other valuable information in storage or in transit. Keys are stored for use in decryption, typically a reverse algorithm of encryption. Unfortunately, hackers discover keys and use them to unlock valuables online.

Another problem with stored keys and security systems, is vulnerability to a single point of failure. In other words, if a key is corrupted, deleted, or otherwise made inaccessible, access to secure digital assets could be lost forever in an encrypted state.

While absence of stored keys and other security data increases the security of digital assets significantly, a technique is needed for fault-tolerant recreation of security keys with live data redundancy and without using stored sensitive security data, for decryption.

SUMMARY

To meet the above-described needs, methods, computer program products, and systems are provided for redundantly encrypting access to digital assets, without storing sensitive security data for decryption.

In one embodiment, a monitoring module can receive a request to protect a digital asset. In response, an encryption module generates a key or a private-public key pair using a standard technique for generation of cryptographic keys (e.g., NIST SP800-133r2) or by using the methods outlined in U.S. patent application Ser. No. 17/988,614.

In another embodiment, once a key is created and for redundancy, the encryption module can generate a polynomial, wherein coefficients of the polynomial are derived from bits of the encryption key, and then evaluate the polynomial several times that exceed the number of coefficients of the polynomial to obtain (x, y) value pairs. Each Y value is the solution to the polynomial at an X value, and each X value is generated from sensitive security data sourced in real-time from a user context by one or more functions selected from a plurality of available functions.

The monitoring module then stores the selected functions together with their corresponding y-values in (function, y) pairs, and deletes the encryption key, the x-values, the coefficients, and other data.

In another embodiment, the monitoring module subsequently receiving a request for access to the digital asset. In response, the decryption module generates the bits of a decryption key from the bits of coefficients of a polynomial. The bits of coefficients are generated from the integer coefficients, wherein the integer coefficients are generated from (x, y) pairs using polynomial interpolation. The Y values are retrieved from stored (function, y) pairs, and X values are created by combining sensitive security data outputted live in real-time by functions denoted by stored (function, y) pairs.

In still another embodiment, upon access to the digital asset, the decryption module deletes the decryption key, the x-values, the coefficients, and other data. Upon failure to access to the digital asset, the decryption module repeats the process of creation of the decryption key with different groups of functions until combinations of stored (function, y) pairs are exhausted.

Advantageously, digital assets are better protected against hacking without stored keys and without a single point of failure.

BRIEF DESCRIPTION OF THE DRAWINGS

In the following drawings, like reference numbers are used to refer to like elements. Although the following figures depict various examples of the invention, the invention is not limited to the examples depicted in the figures.

FIGS. 4A and 4A1 are more detailed flow diagrams illustrating encryption, with live data redundancy and without storing sensitive security data, from the method of FIG. 3, according to one embodiment.

FIGS. 5A and 5A1 are more detailed flow diagram illustrating decryption, with live data redundancy and without stored sensitive security data, from the method of FIG. 3, according to one embodiment.

DETAILED DESCRIPTION

Methods, computer program products, and systems for deriving thresholds for encrypting access to digital assets, with live data redundancy and without storing sensitive security data, for decryption. One of ordinary skill in the art will recognize many alternative embodiments that are not explicitly listed based on the following disclosure.

I. Systems for Redundancy in Encryption/Decryption Without Storing Sensitive Security Data (FIGS. 1-2)

Figure 1:
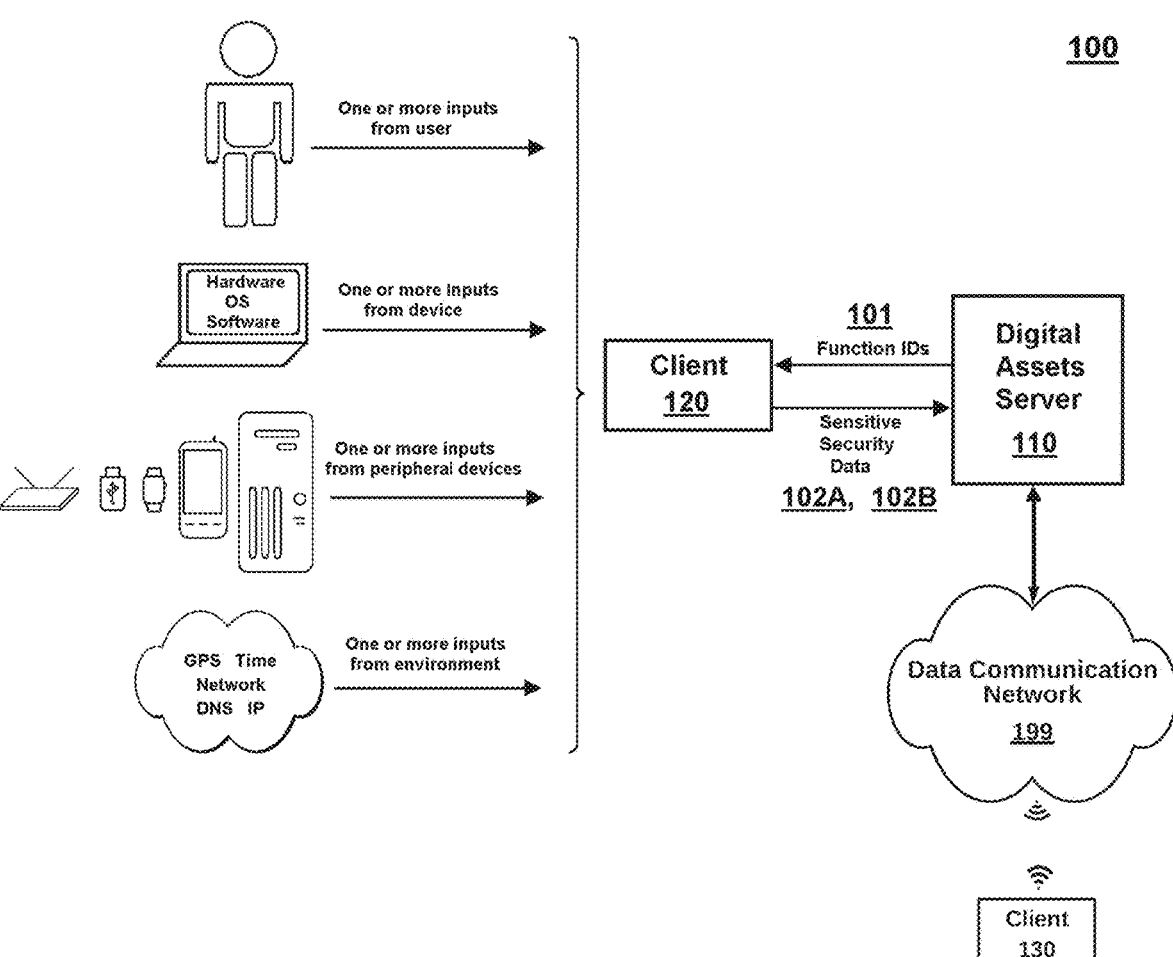
FIG. 1 is a high-level block diagram illustrating a system for encrypting and decrypting access to digital assets, with live data redundancy and without storing sensitive security data for decryption, according to one embodiment.
Figure 2:
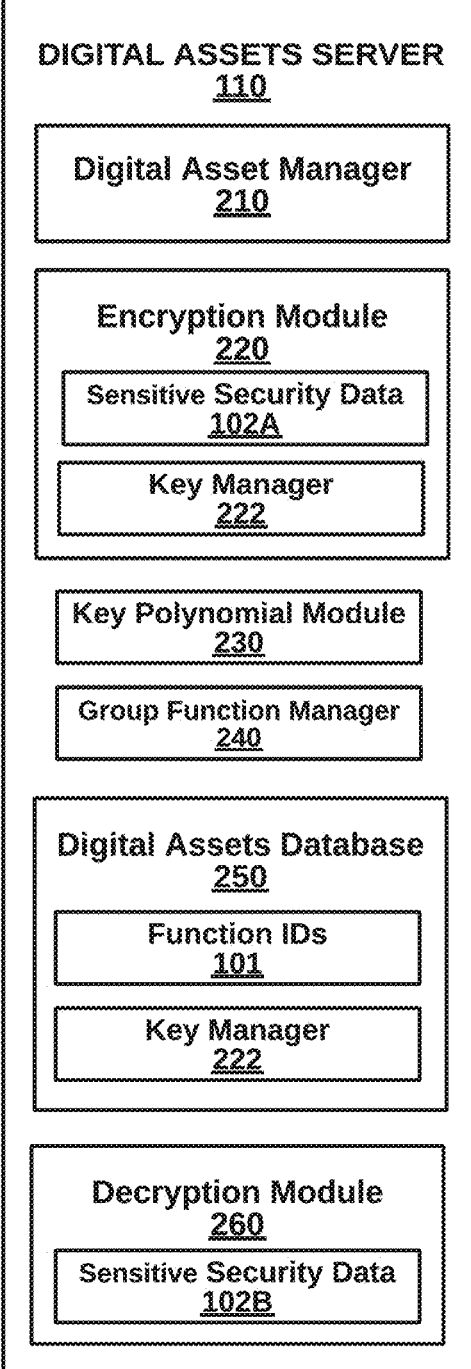
FIG. 2 is a more detailed block diagram illustrating a digital asset server of the system of FIG. 1, according to one embodiment.

FIG. 1 is a high-level block diagram illustrating a system 100 for encrypting and decrypting access to digital assets, with live data redundancy and without storing sensitive security data for decryption, according to one embodiment. The system 100 includes a digital asset server 110 and client 120, coupled in communication with a data communication network 199. Other embodiments of the system 100 can include additional network components that are not shown in FIG. 1. For example, there can be network devices such as switches, routers, fire walls, proxy servers, network gateways, network managers, and the like. Many other variations are possible.

The components of the system 100 are coupled in communication over the data communication network. The components can be connected to the data communication system via hard wire (e.g., digital assets server 110, client 120). The components can also be connected via wireless networking (e.g., client 120, client 130). The data communication network 199 can be composed of any data communication network such as an SDWAN, an SDN (Software Defined Network), WAN, a LAN, WLAN, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802.11r, and the like. Components can use IPv4 or IPv6 address spaces.

The client 120 is directly connected to the digital assets server 110, while the client 130 is indirectly connected over a network. A direct connection may be used for digital access to local locks protecting a room or lockbox, or for digital access to physical assets such as an IoT (Internet of Things) device like a front door to a house. An indirect connection may be used for online assets, for accessibility from any Internet connection. In one implementation, a daemon, app, or operating system patch is downloaded for communication with the digital assets server 110. In another implementation, no pre-configuration is needed, and an Internet browser, operating system and other existing software is leveraged for operation.

Figure 8:
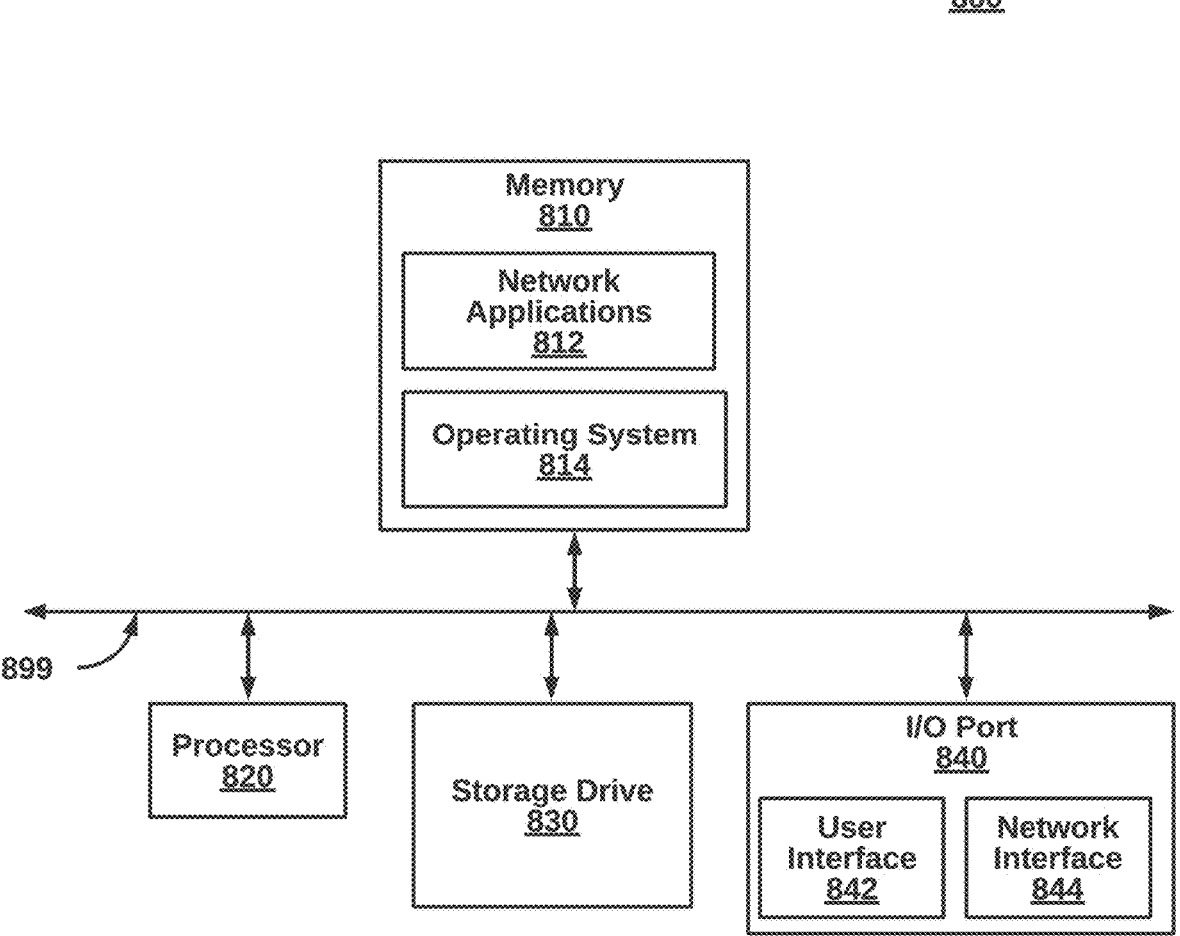
FIG. 8 is a block diagram illustrating a computing device for the system of FIG. 1, according to one embodiment.

The clients 120, 130 can be implemented as, for example, a mobile station, a STA, a client or a wireless device, a personal computer, a laptop, a tablet computer, a smart phone, a mobile computing device, Internet access applications, an end station or any other computing device as described in FIG. 8. The client 120 can be integrated or connected by USB, Bluetooth or other peripheral connectors. The client 130 is wirelessly coupled to an access point or other network device using a radio and antenna. The client 130 can operate according to wireless standards such as IEEE 802.11a, b, g, n, ac, w or any other wireless standard.

A digital asset, as referred to herein, can be a digital file, an account leading to digital files, an online service, digital streaming (packets), a crypto wallet, a login, or the like. For example, access to a bank account may require real-time data collection at the client 120 for decrypting login credentials, which upon unlocking, automatically display the bank account dashboard. In another example, a user selects a photo thumbnail for downloading from an online archive, triggering real-time data collection at the client 120 for decrypting the photo. In yet another example, a user needs access to a secure room or deposit box which unlocks upon successful decryption from real-time data collection at the client 120. Multiple assets can be secured by a single key in some implementations, and multiple keys can secure a single assets in other implementations.

Sensitive security data 102 is shown as being sourced by the client 120 from a group of functions, also be referred to as gestures. A gesture can be, without limitation, a function name, a function ID, a URL, a programming language interface, a programming language pointer, a callback, a database record with a function body. The gesture types of system 100 include user facing functions 121, device detection functions 122, peripheral communication functions 123, and physical and network detection functions 124.

The user facing functions 121 can collect biological data such as fingerprints, retina scans, voice recognition, face recognition, and the like, as well as data from user's memory, intellect, dexterity, or gait. The security device detection and identification functions 122 can collect hardware configuration of a computer, an operating system type and version, a list of installed software applications, and other aspects of the direct computing environment. Similarly, the peripheral detection and identification functions 123 can communicate and source data from indirectly connected computer devices to the security device, such as smart phones, network switches, servers, printers, and other wired or wireless devices. Finally, physical and network detection functions 124 can involve GPS location, DNS data, IP address, and other environmental factors of the user and of the security device. Of course, these are non-limiting examples and non-limiting combinations for sourcing live data in real-time and producing sensitive security data. Some implementations require only two inputs while other more valuable digital assets can require a large number of inputs. For flexibility, the requirement can be inputs from one, two, three, or four gesture types, as determined by reliability, accuracy, or the like.

FIG. 2 is a more detailed block diagram of an embodiment illustrating the digital asset server 110 of the system 100 of FIG. 1, according to one embodiment. The digital asset server 110 includes a digital asset manager 210, an encryption module 220, a key manager 222, a key polynomial module 230, a group function manager 240, a digital assets database 250, and a decryption module 260. The components can be implemented in hardware, software, or a combination of both.

The digital asset manager 210 (or controller), in one embodiment, receives a request to protect a digital asset. In general, the digital asset manager 210 can be an interface with users or processes storing and retrieving/accessing digital assets. At a later point in time, the digital asset manager 210 receives a request for access to the same digital asset. During access, the file can be edited, duplicated, deleted, or removed.

The encryption module 220 creates an encryption key from sensitive security data sourced from one or more functions. The sensitive security data is live data retrieved in real-time from a user context. Each function can describe a live data requirement used to construct the encryption key. The digital asset is then encrypted with the encryption key from sensitive security data.

The group function manager 240 forms a group of functions for sourcing sensitive security data from functions for collection of redundant combinations of live data for decryption. Any of the groups formed can independently provide the x-value of a point of the polynomial.

The key polynomial module 230 manages polynomials used during the encryption and decryption processes. An encryption key defines a polynomial, and subsequently the polynomial exposes the decryption key. The digital assets database 250 stores the specific digital asset, as encrypted, along with multiple other encrypted digital assets. The digital assets can all belong to a single entity or user, or can belong to multiple different users having different secure user accounts. The encryption key with the sensitive security data is deleted. Instead, one or more indicators of the one or more functions related to the encryption key are stored in association with the digital asset, without any of the sensitive security data being stored. Consequently, in the case of hacking, the encrypted digital asset will be extremely difficult to decrypt.

The decryption module 260, at a subsequent time, provides access to the digital asset. A decryption key is created with current sensitive security data using the one or more stored indicators of the one or more functions to obtain a current instance of live data in real-time from a current user context. Finally, the digital asset is decrypted with the decryption key from current sensitive data, for access to the digital asset. The decryption key with the sensitive security data is deleted to preserve high security.

In another embodiment, the encryption module 220 can re-encrypt the digital asset after access is completed. A new re-encryption key is generated using live data collected in real-time and can rely upon a new group of functions. A client uses gestures (e.g., function IDs) to request various data combined as sensitive security data. The various data can be palm print, a hand gesture and an operating system type, for example. The specific functions engaged for re-encryption can be different in some embodiments and kept the same in other embodiments. The re-encryption process can be responsive to a time out, closing a digital file, user request, 3rd party server request, and other triggers.

In operation, the digital asset server 110 redundantly encrypts and decrypts digital assets, by collecting sensitive security data in real-time. For encrypting, sensitive security data is collected from a user context and then destroyed together with the encryption keys when storing the encrypted digital assets. When subsequent access is needed, new sensitive security data is collected in real-time from a user context for decryption. Thus, sensitive security data collected at a time of encryption needs to match sensitive security data collected at a time of decryption for success, in some implementations. In one case, the digital assets server 110 initiates the process upon request for storing or retrieving digital assets. In another case, the client 120 can decide on inputs and collect data passed onto the digital assets server 110 for processing. In one case, a user encrypts and stores a digital asset using the client 120 and retrieves and decrypts the digital asset using the client 130.

II. Methods for Redundancy in Encryption/Decryption Without Storing Sensitive Security Data (FIGS. 3-7)

Figure 3:
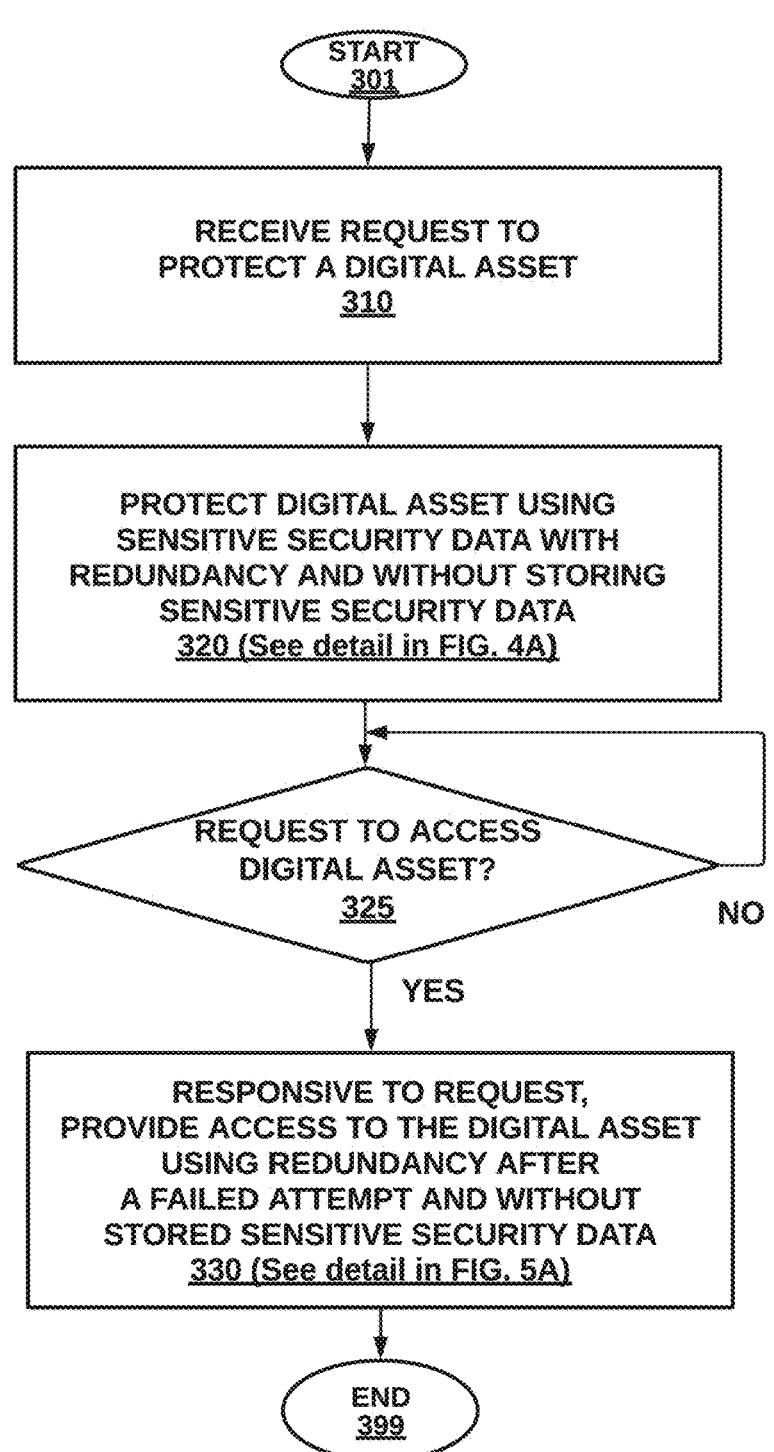
FIG. 3 is a high-level flow diagram illustrating a method for protecting and gaining access to digital assets, according to one embodiment.

FIG. 3 is a high-level flow diagram illustrating a method 300 for protecting access to digital assets at rest, in transit or being streamed, according to an embodiment. The method 300 can be implemented by, for example, the digital assets server 110 of FIG. 1.

At step 310, a request is received to protect a digital asset. The request can be from a process or a user over a user interface, for instance. Also, the request can be local or over the Internet. A specific user account can be indicated in the request, for storing a map of digital assets in long term memory for the user.

At step 320, a digital asset is protected using sensitive security data and without storing sensitive security data, as discussed further below with regards to FIG. 4.

At step 325, a request for access to the digital asset is received. In response, at step 330, access is provided to the digital asset using redundancy to cure failed attempts, as described more fully with respect to FIG. 5A.

Figure 4A:
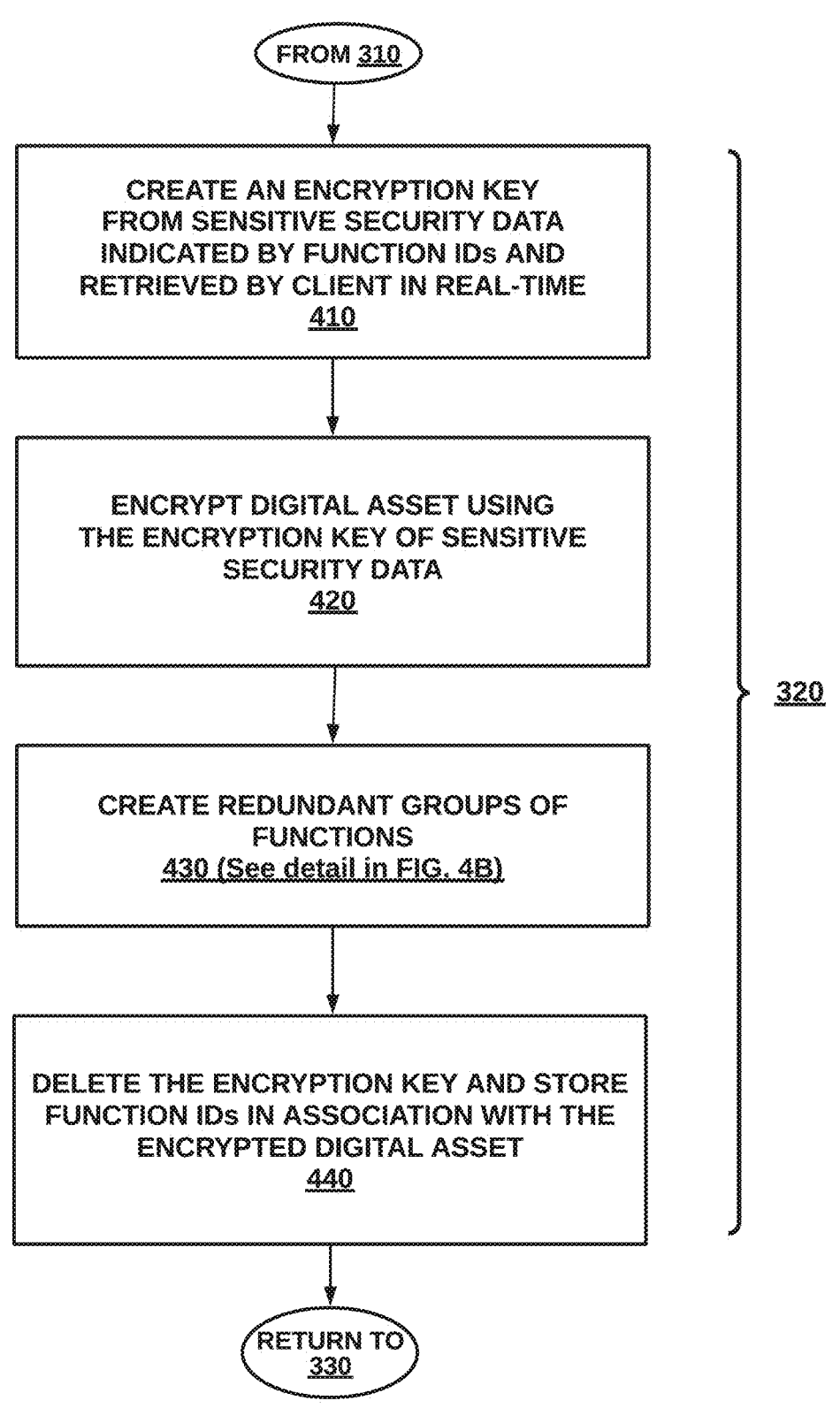
Figure 7:
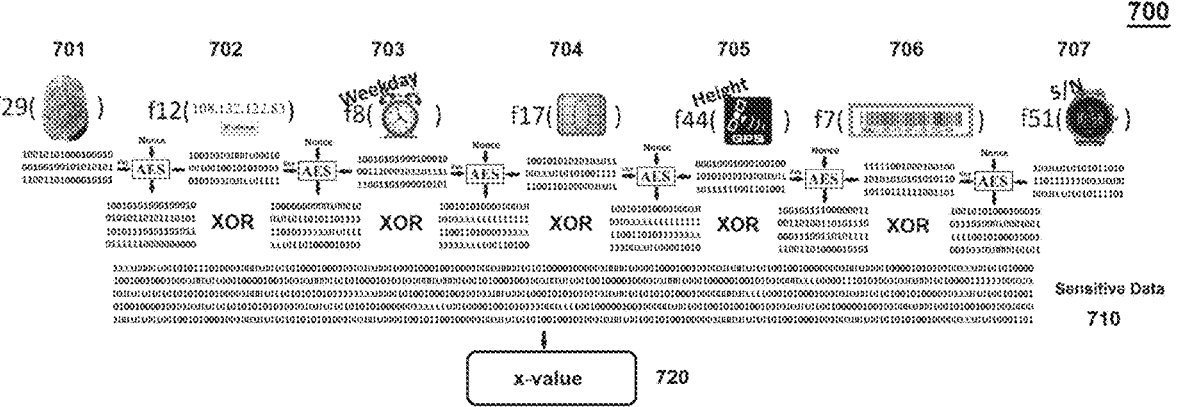
FIG. 7 is a diagram illustrating the process of generation of x-values used in polynomial interpolation, according to an embodiment.

Turning now to FIGS. 4A and 5A, further details are provided for the encryption step 320 and the decryption step 330, respectively. First, at step 410 of FIG. 4A, an encryption key is created from sensitive security data for encryption, corresponding to a first group of functions. In one instance, a specific set of functions are identified by a function ID, for collection at a client, such as fingerprint and MAC address of the user device. The real-time data is used to encode the digital asset. For example, FIG. 7 shows functions with live data 701-707. The sensitive security data 710 is processed to be input for an SHA3 module 720 to output an x-value or a cryptographic key 730.

Figure 4B:
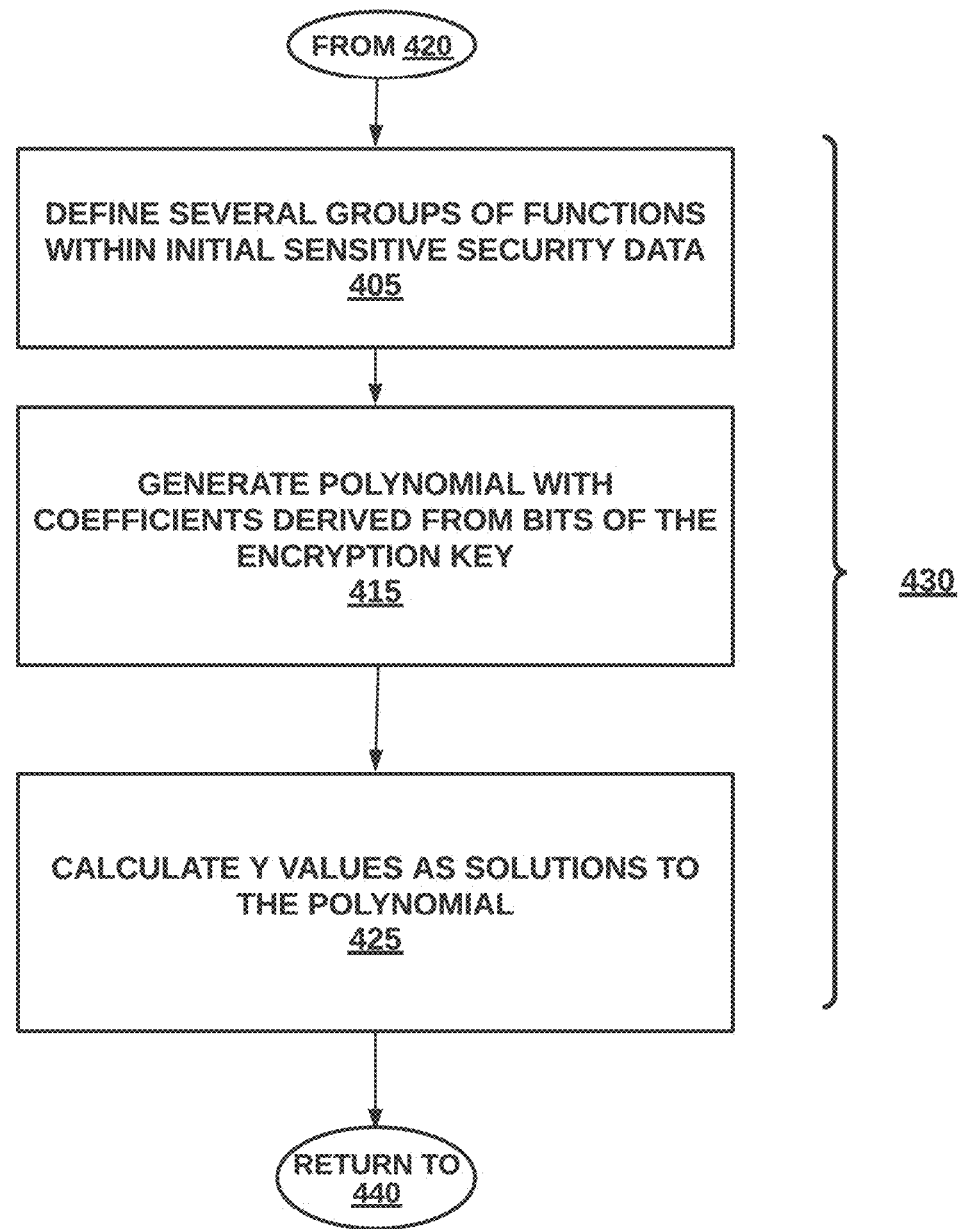
FIG. 4B is a more detailed flow diagram of a step of creating redundant groups of functions, from the method of FIG. 4B, according to one embodiment.

At step 420, the digital asset is encrypted using the encryption key derived from sensitive security data. At step 430, redundant groups of functions are created, as described in FIG. 4B and shown in FIG. 7. Turning now to FIG. 4B, step 405, several groups of functions are defined capable of producing sensitive security data. At step 415 a polynomial is generated wherein coefficients of the polynomial are derived from bits of the encryption key. To do so, the bits are split based on the degree of the polynomial (e.g., 2nd degree polynomial requires three coefficients, and a 3rd degree polynomial requires four coefficients). At step 425, Y values 730 are calculated as solutions to the polynomial wherein X values are sourced from live data collections. As a result, any of the groups of functions can recover the digital asset.

Returning to FIG. 4A, rather than storing the encryption key, it is deleted, disabled, quarantined, trashed, or otherwise impaired from use by a hacker, at step 440. One or more indicators of the one or more functions related to creating the encryption key along with Y values are stored in association with the digital asset, without any of the sensitive security data.

FIG. 5A details the decryption step 330, in one nonlimiting embodiment. At step 510, function IDs related to a requested asset are retrieved. A request can be sent to a client that is requesting access, to collect certain live data. The data collection is in real-time and based on a current user context. The same functions are used for encryption and decryption.

Figure 5B:
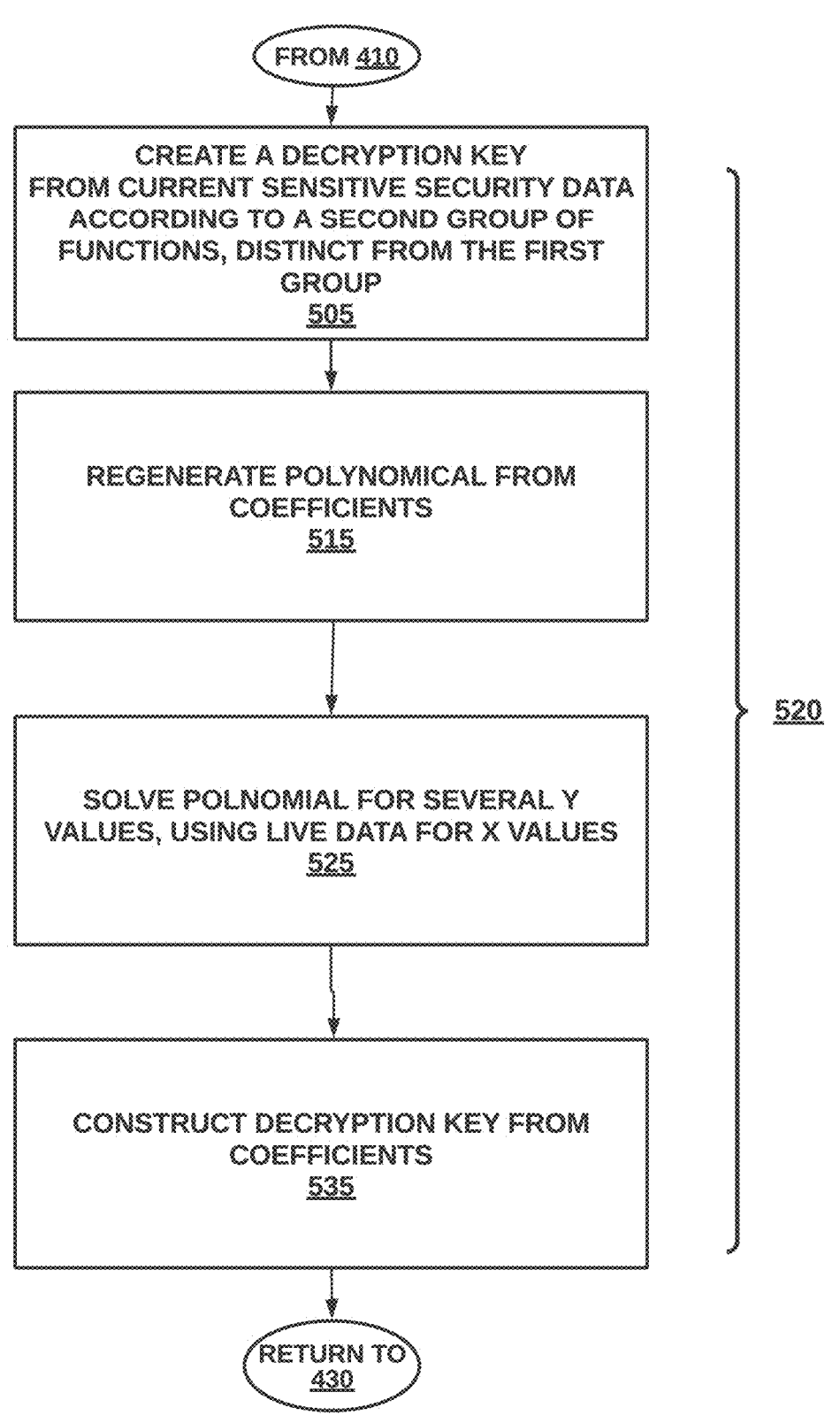
FIG. 5B is a more detailed flow diagram illustrating a step of creating a decryption key from sensitive security data indicated by function IDs and retrieved by a client in real-time, from the method of FIG. 5A, according to one embodiment.

At step 520, a decryption key is created with current sensitive data collected, as shown in FIG. 5B and FIG. 7. In more detail, at step 505 a decryption key is created with sensitive security data according to a second group of functions, a distinct combination from the first group. At step 515, a polynomial is regenerated from coefficients. At step 525, the polynomial is solved for several Y values, using x-values from live data. The coefficients reveal key bits. Finally, at step 535, the decryption key is constructed from the key bits.

As long as the current sensitive security data for the second group of functions leads to Y values within tolerance, the new key will successfully decrypt the digital asset, at step 530. Matching tolerances are implementation-specific. However, failure to decrypt the digital asset, at step 540 will result in a backup group of function IDs being selected, at step 545, to create a new decryption key, at step 520. This process may repeat several times, if needed.

An additional example of the fault tolerant step 320 to protect a digital asset is depicted in FIG. 4A1. The method assumes that a plurality of data collection functions, capable of collecting all types of data, have already been created and added to a pool of available functions with each function designated by a gesture ID. The method also assumes that the encryption key of the digital asset has been created and it is available. Groups of functions are formed by combinations of available functions, and it is common for the same function to appear in many groups and the same function even appear multiple times in a group.

In step 401 the bits of the encryption key are cut into a number of bit-slices and the resulting bitstrings are each converted to an integer in step 402. In step 403 the generated integers become the coefficients of a polynomial. In one embodiment, number of coefficients is deterministically calculated from the type, size, owner, creation time/place, name/ID and the like of the digital asset.

In one embodiment, to create redundancy for access to a digital asset and prior to encryption, in step 404 groups of functions are created from the pool of available functions, with the number of groups exceeding the number of coefficients often by 2, 3 or 4 times. Formed groups may be of any size (i.e., contain any number of functions), with some of the functions being the same as in other groups, as long as all groups are unique. In an embodiment, groups are formed in an ascending level of security, by expanding the number and type of live data collected and including a growing number of user-facing functions.

Functions in each group in step 404 produce sensitive security data from live data collected in real time from a user context. Each group combines its sensitive data in step 405 and generates a positive integer. The generated integers whose number exceeds the number of coefficients of the polynomial become x-values in step 405. In step 406 the x-values are used to evaluate the polynomial and get the corresponding y-values, which are then used in step 407 to form (x, y) pairs. In step 408, the x-values in the (x, y) pairs are replaced by the group of functions that generated them and together with their corresponding y-values are stored for use in decryption. Finally, in step 409 rather than storing the encryption key, it is deleted, disabled, quarantined, trashed, or otherwise impaired from use by a hacker. Sensitive security data, coefficients, x-values, bitstrings and everything else are also deleted securely.

Another example of the fault tolerant step 340 to decrypt a digital asset is depicted in FIG. 5A1. A protected digital asset is decrypted with the groups of functions and their corresponding y-values 501 which are associated with the digital asset and were stored during encryption. In step 502 a number of (Groupi, yi) pairs are selected in a combination from the stored (Groupi, yi) pairs and fetched from storage. The number of selected (Groupi, yi) pairs matches the number of coefficients of the polynomial 403.

In step 503 the functions in each group produce sensitive security data from live data collected in real time from a user context and combines it to generate a positive integer. The end result is the generation of a number of x-values equal to the number of coefficients.

In step 504 the generated x-values replace the groups that generated them in the (Groupi, yi) pairs of 502, resulting in a number of (x, y) pairs equal to the number of coefficients. The (x, y) pairs are used in step 505 to interpolate a polynomial and obtain its integer coefficients. The integer coefficients are turned into bitstrings in step 506 and the bitstrings are combined in step 507 to form the decryption key. Finally, in step 508 after use, the decryption key is deleted together with sensitive security data, x-values, coefficients, bitstrings and everything else.

Even though there can be as many groups as there are unique subgroup combinations of functions from the pool of available functions, decryption 340 can only select in step 502 a fixed number of combinations from n-out-of-r groups, where n is the number of groups required to recreate the polynomial and r is the number of available groups saved in storage by encryption in step 408. Larger subgroups (i.e., large n) leads to fewer combinations. The total number of groups needed is dictated by the degree of the polynomial, and the total number of groups available, is implementation specific.

The fault tolerance and robustness of method 300 stems from a redundancy created by encryption 320 and utilized by decryption 340. Encryption creates redundancy in steps 404 and 407 where more pairs than actually needed are created and stored in step 408, and decryption takes advantage of redundancy in step 502 by creating combinations of (Groupi, yi) pairs from a plurality of (Groupi, yi) pairs stored during encryption. The recursive nature of decryption in method 300 is seen in step 345 where failure to decrypt the digital asset causes the execution of the decryption process with a different combination of stored groups of functions.

Figure 6:
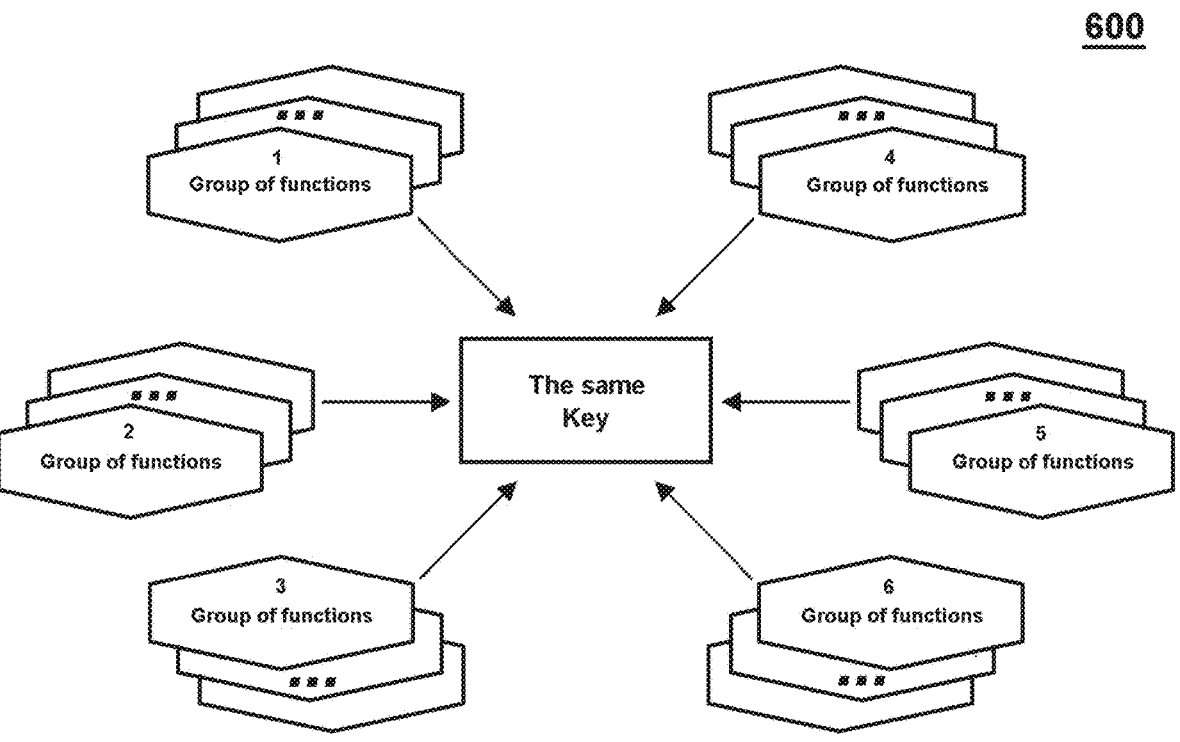
FIG. 6 is a diagram illustrating redundancy provided by groups of functions, for recreation of keys of method of FIG. 5, according to an embodiment.

FIG. 6 further illustrates how robustness stems from redundancy with several groups of unrelated functions creating the same decryption key. Each group of functions 600 can generate the same key even though functions in the groups produce a variety of sensitive security data from 2, 20 or even 100s of different captures of live data by functions in the group. This is possible because the different and unrelated groups of functions do not create the key directly, but instead, they generate the x-values of (x, y) pairs from which the polynomial, and therefore the key, is created. And since the polynomial can be created by an infinite number of combinations of an infinite number of (x, y) pairs which are points on the curve of the polynomial, an infinite number of groups of functions can create the same decryption key.

FIG. 7 illustrates how a group of functions (701-707) can generate an x-value 720 from sensitive data 710. Redundancy is provided by generating a large number of unrelated x-values from unrelated groups functions and plugging them into the polynomial to calculate the corresponding y-values.

Tables 1 and 2 below show examples of the encryption and decryption methods described herein.

TABLE 1

| ENCRYPTION of Asset | | |
| --- | --- | --- |
| Step | | Description |
| | Action | |
| 1 | K$_{pri}$ | We assume that a private key has already been generated either by a method listed in NIST SP800-133r2 or by using Leo_4 |
| 2 | 4 | Plug into an algorithm the AssetID, the name and other characteristics of the asset to be protected and get a number Z in the range 1-6 |

TABLE 1-continued

ENCRYPTION of Asset

| Step | | Description |
|------|------|------|
| 3 | $ax^3 + bx^2 + cx + d$ | $Z = 4$ is the number of coefficients, so generate a polynomial of degree 3 |
| 4 | $a \Leftarrow$ bits | generate coefficient a from $\frac{1}{4}$ of $K_{pri}$ bits (chunk determined by algorithm) |
| | $b \Leftarrow$ bits | generate coefficient b from $\frac{1}{4}$ of $K_{pri}$ bits (chunk determined by algorithm) |
| | $c \Leftarrow$ bits | generate coefficient c from $\frac{1}{4}$ of $K_{pri}$ bits (chunk determined by algorithm) |
| | $d \Leftarrow$ bits | generate coefficient d from $\frac{1}{4}$ of $K_{pri}$ bits (chunk determined by algorithm) |
| 5 | 8 | generate a random number W in the range Z-3Z |
| 6 | $F_{11}, F_{21}, F_{32}, F_{41},$ $F_{15} \rightarrow x_1$ | generate $x_1$ from live output of functions selected by an algorithm |
| | $F_{107}, F_{03}, F_{11} \rightarrow x_2$ | generate $x_2$ from live output of functions selected by an algorithm |
| | $F_{05}, F_{99}, F_{21}, F_{21},$ $F_{100}, F_{04}, F_{16} \rightarrow x_3$ | generate $x_3$ from live output of functions selected by an algorithm |
| | $F_{87}, F_{18}, F_{54}, F_{110},$ $F_{04}, F_{21}, F_{32}, F_{41}$ $\rightarrow x_4$ | generate $x_4$ from live output of functions selected by an algorithm |
| | $F_{85}, F_{22}, F_{66}, F_{01}$ $\rightarrow x_5$ | generate $x_5$ from live output of functions selected by an algorithm |
| | $F_{91}, F_{107}, F_{04}, F_{77},$ $F_{04}, F_{121} \rightarrow x_6$ | generate $x_6$ from live output of functions selected by an algorithm |
| | $F_{85}, F_{01}, F_{64}, F_{55},$ $F_{72}, F_{26} \rightarrow x_7$ | generate $x_7$ from live output of functions selected by an algorithm |
| | $F_{44}, F_{81}, F_{71}, F_{31},$ $F_{115} \rightarrow x_8$ | generate $x_8$ from live output of functions selected by an algorithm |
| 7 | $(x_1, y_1) (x_2, y_2)$ $(x_3, y_3) (x_4, y_4)$ $(x_5, y_5) (x_6, y_6)$ $(x_7, y_7) (x_8, y_8)$ | Evaluate the polynomial at $x_1$ $x_2$ $x_3$ $x_4$ $x_5$ $x_6$ $x_7$ $x_8$ and generate 8 (x, y) pairs All $x_i$ must be unique |
| | Storage | |
| 8 | $(F_{11}, y_1) (F_{21}, y_1)$ $(F_{32}, y_1) (F_{41}, y_1)$ $(F_{15}, y_1)$ G1 | Form $(F_i, y_j)$ pairs, group them by $x_j$, and store them under AssetID |
| | $(F_{107}, y_2) (F_{03}, y_2)$ $(F_{11}, y_2)$ G2 | Delete $K_{pri}$, all $x_j$, the coefficients, bitstrings, live data and everything else |
| | $(F_{05}, y_3) (F_{99}, y_3)$ $(F_{21}, y_3) (F_{21}, y_3)$ $(F_{100}, y_3) (F_{04}, y_3)$ $(F_{16}, y_3)$ G3 | |
| | $(F_{87}, y_4) (F_{18}, y_4)$ $(F_{54}, y_4) (F_{110}, y_4)$ $(F_{04}, y_4) (F_{21}, y_4)$ $(F_{32}, y_4) (F_{41}, y_4)$ G4 | |
| | $(F_{85}, y_5) (F_{22}, y_5)$ $(F_{66}, y_5) (F_{01}, y_5)$ G5 | |
| | $(F_{91}, y_6) (F_{107}, y_6)$ $(F_{04}, y_6) (F_{77}, y_6)$ $(F_{04}, y_6) (F_{121}, y_6)$ G6 | |
| | $(F_{85}, y_7) (F_{01}, y_7)$ $(F_{64}, y_7) (F_{55}, y_7)$ $(F_{72}, y_7) (F_{26}, y_7)$ G7 | |
| | $(F_{44}, y_8) (F_{81}, y_8)$ $(F_{71}, y_8) (F_{31}, y_8)$ $(F_{115}, y_8)$ G8 | |

TABLE 2

DECRYPTION of Asset

| Step | Action | Description |
|------|------|------|
| 9 | 4 | Plug into the algorithm employed in Step_2 the AssetID the name and other characteristics of the asset and get the same number Z |
| 10 | 2 5 7 8 | Use an algorithm to choose $Z = 4$ numbers in the range 1-W (step 5) (W is the number of groups of $(F_i, y_j)$ pairs in the database under AssetID) |
| 11 | $(F_{107}, y_2) (F_{03}, y_2)$ $(F_{11}, y_2)$ G2 $(F_{85}, y_5) (F_{22}, y_5)$ $(F_{66}, y_5) (F_{01}, y_5)$ G5 | Use AssetID to fetch from storage G2 G5 G7 G8 4 groups of $(F_i, y_j)$ pairs |

TABLE 2-continued

DECRYPTION of Asset

| Step | Action | Description |
|------|--------|-------------|
| | $(F_{85}, y_7) (F_{01}, y_7)$ | |
| | $(F_{64}, y_7) (F_{55}, y_7)$ | |
| | $(F_{72}, y_7) (F_{26}, y_7)$ | |
| | G7 | |
| | $(F_{44}, y_8) (F_{81}, y_8)$ | |
| | $(F_{71}, y_8) (F_{31}, y_8)$ | |
| | $(F_{115}, y_8)$ G8 | |
| 12 | $F_{107}, F_{03}, F_{11}$ $\rightarrow x_2$ | Execute the $F_i$ functions of each group to obtain live data from current user context, and combine outputted sensitive security data to generate $x_2\ x_5\ x_7\ x_8$ values |
| | $F_{85}, F_{22}, F_{66},$ $F_{01} \rightarrow x_5$ | |
| | $F_{85}, F_{01}, F_{64},$ $F_{55}, F_{72}, F_{26}$ $\rightarrow x_7$ | |
| | $F_{44}, F_{81}, F_{71},$ $F_{31}, F_{115} \rightarrow x_8$ | |
| 13 | $(x_2, y_2) (x_5, y_5)$ $(x_7, y_7) (x_8, y_8)$ | Use Ys from step 11 and Xs from step 12 to form 4 (x, y) pairs |
| 14 | $ax^3 + bx^2 + cx + d$ | Use the 4 (x, y) pairs and Lagrange interpolation to calculate the a, b, c, d coefficients of a polynomial |
| 15 | $a \Rightarrow$ bits | Convert positive integer a to bits |
| | $b \Rightarrow$ bits | Convert positive integer b to bits |
| | $c \Rightarrow$ bits | Convert positive integer c to bits |
| | $d \Rightarrow$ bits | Convert positive integer d to bits |
| 16 | $K_{pri}$ | Use the algorithm originally employed in Step_4 to combine the 4 bit-chunks and form $K_{pri}$ |
| 17 | | Use $K_{pri}$ to decrypt the asset and then delete everything including $K_{pri}$ |
| 18 | | If decryption succeeded, STOP |
| 19 | | If decryption failed, go to Step_10 to choose 4 new numbers. Repeat until all possible combinations of 4-out of-8 are exhausted |

III. Computing Device for Redundancy in Encryption/Decryption Without Storing Sensitive Security Data (FIG. 8)

FIG. 8 is a block diagram illustrating an example of a computing device 800 for use in the system 100 of FIG. 1, according to one embodiment. The computing device 800 is a device that is implementable for each of the components of the system 100 for encrypting redundant access to digital assets, without storing sensitive security data for decryption. Each of the digital assets server 110, the client 120 and the client 130 can be implemented using the computing device 800. However, the computing device 800 is merely an example implementation itself, since the system 100 can also be fully or partially implemented with other computing devices, such as laptop computers, tablet computers, smart cell phones, Internet access applications, and the like.

The computing device 800 of the present embodiment, includes a memory 810, a processor 820, a hard drive 830, and an I/O port 840. Each of the components is coupled for electronic communication via a bus 888. Communication can be digital and/or analog and use any suitable protocol.

The memory 810 further comprises network access applications 812 and an operating system 814. Network access applications 812 can include a web browser, a mobile access applications, an access applications that uses networking, a remote access applications executing locally, a network protocol access applications, a network management access applications, a network routing access applications, or the like.

The operating system 814 can be one of the Microsoft Windows® family of operating systems (e.g., Windows 98, Me, Windows NT, Windows 2000, Windows XP, Windows XP x64 Edition, Windows Vista, Windows CE, Windows Mobile, Windows 7-11), Android, Linux, HP-UX, UNIX, Sun OS, Solaris, Mac OS X, iOS, Alpha OS, AIX, IRIX32, or IRIX84. Other operating systems may be used. Microsoft Windows is a trademark of Microsoft Corporation.

The processor 820 can be a network processor (e.g., optimized for IEEE 802.11), a general purpose processor, an access applications-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 820 can be single core, multiple core, or include more than one processing elements. The processor 820 can be disposed on silicon or any other suitable material. The processor 820 can receive and execute instructions and data stored in the memory 810 or the hard drive 830.

The storage device 830 can be any non-volatile type of storage such as a magnetic disc, EEPROM, Flash, or the like. The storage device 830 stores code and data for access applications.

The I/O port 840 further comprises a user interface 842 and a network interface 845. The user interface 842 can output to a display device and receive input from, for example, a keyboard. The network interface 844 connects to a medium such as Ethernet or Wi-Fi for data input and output. In one embodiment, the network interface 844 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, Cif, Oracle® Java, JavaScript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

I claim:

1. A method in a security device for securing and providing access to protected digital assets, with live data redundancy and without using stored sensitive security data, for decryption, the method comprising:

receiving a request to protect a digital asset, and in response:

defining and storing a group of functions for sensitive security data collection and a plurality of distinct subgroups of functions needed for decryption, wherein the sensitive security data is derived from live data retrieved in real-time from a user context, and wherein a function describes a live data requirement that is converted to an X value upon collection;

creating an encryption key from a first subgroup of functions from a plurality of distinct subgroups of functions, wherein the plurality of distinct subgroups are each selected from the group of functions;

encrypting the digital asset with the encryption key sourced from the first subgroup of functions using the live data, for storage;

generating a polynomial, wherein coefficients to the polynomial are derived from bits of the encryption key;

calculating Y values as solutions to the polynomial, by using a plurality of distinct X values sourced from the plurality of distinct subgroups of functions using the live data including the first subgroup of functions; and deleting the encryption key and the live sensitive data, and storing the identifiers of the plurality of the subgroups of functions and a Y value associated with each of the plurality of subgroups of functions;

subsequently receiving a request for access to the digital asset, and in response:

obtaining from a subgroup of functions current-live sensitive data in real-time from a current user context, creating a decryption key wherein bits of the decryption key are derived from the coefficients of a polynomial, wherein the coefficients are regenerated from both the stored Y-values and the current-live sensitive data, wherein the current-live sensitive data is sourced from a subgroup of functions from the plurality of subgroups; and decrypting the digital asset with the decryption key, derived from current live sensitive security data, for access to the digital asset.

2. The method of claim 1, further comprising:

evaluating the polynomial a number of times that exceeds the number of coefficients.

3. The method of claim 1, wherein the regenerating the polynomial step comprises regenerating the polynomial by regenerating the coefficients to construct the decryption key wherein bits of the decryption key are derived from the coefficients.

4. The method of claim 1, wherein the step of creating the decryption key further comprises:

creating (x, y) pairs with stored (indicator, y) pairs, wherein using the one or more indicators of one or more functions to obtain a current instance of live data in real-time from a current user context and output current sensitive data, and combining the current sensitive data to derive x-values.

5. The method of claim 1, wherein the step of creating the decryption key further comprises:

a number of (x, y) pairs necessary to create the decryption key matches a number of coefficients of the polynomial.

6. The method of claim 1, wherein the step of creating the decryption key further comprises: using a polynomial interpolation algorithm to calculate the integer coefficients of a polynomial with (x, y) pairs.

7. The method of claim 1, wherein the step of creating the decryption key further comprises:

converting each integer coefficient into bits and combining the bits of all coefficients to form the decryption key.

8. The method of claim 1, wherein if the creation of the decryption key fails, the method further comprises:

repeating the creation of the decryption key with groups of (indicator, y) pairs until combinations of stored (indicator, y) pairs, are exhausted.

9. The method of claim 1, wherein current user context comprises but not limited to combinations of: live data obtained on the fly from intellect, memory, biometrics, dexterity, physical movement and proximity of the user; and live data obtained on the fly from the hardware, software and communication identification characteristics of the security device; and live data obtained on the fly from peripheral devices accessible by the security device over WiFi, USB, Bluetooth or cellular communications; and live data obtained on the fly from current GMT time and current physical and Internet locations.

10. The method of claim 1, wherein the encryption key comprises: at least one of a password, a token, a cryptographic key, a resource ID, a device ID, an app ID, a nonce, and a challenge string.

11. The method of claim 1, wherein the digital asset comprises one or more of: a digital file, an account leading to a digital file, an online service, a data streaming packet, a crypto wallet, login credentials and access credentials to a physical-hardware object.

12. The method of claim 1, wherein the functions designated by the indicators comprise one or more of: user facing functions, device detection and identification functions, peripheral devices detection and communication functions, and physical and Internet location detection and sensing functions.

13. The method of claim 1, wherein the live data comprises but not limited to one or more of: a fingerprint, a retina scan, a voice sample, a user image, an operating system type, an operating system version, a list of installed applications, a peripheral smartphone, a peripheral network switch, a peripheral router, a GPS location, DNS data, and an IP address.

14. The method of claim 1, wherein indicators of functions comprise one or more of: a function name, a function ID, a URL, a programming language interface, a programming language pointer, a callback, and a database record with a function body.

15. The method of claim 1, wherein the received request to protect the digital asset is received across a data communication network from a client device, and the sensitive security data from key encryption is also received from the client device.

16. A non-transitory, computer-readable medium storing source code that, when executed by a processor, performs a method in a security device for securing and providing access to protected digital assets, with live data redundancy and without using stored sensitive security data, for decryption, the method comprising:

receiving a request to protect a digital asset, and in response:

defining and storing a group of functions for sensitive security data collection and a plurality of distinct subgroups of functions needed for decryption, wherein the sensitive security data is derived from live data retrieved in real-time from a user context, and wherein a function describes a live data requirement that is converted to an X value upon collection;

creating an encryption key from a first subgroup of functions from a plurality of distinct subgroups of functions, wherein the plurality of distinct subgroups are each selected from the group of functions;

encrypting the digital asset with the encryption key sourced from the first subgroup of functions using the live data, for storage;

generating a polynomial, wherein coefficients to the polynomial are derived from bits of the encryption key;

calculating Y values as solutions to the polynomial, by using a plurality of distinct X values sourced from the plurality of distinct subgroups of functions using the live data including the first subgroup of functions; and deleting the encryption key and the live sensitive data, and storing the identifiers of the plurality of the subgroups of functions and a Y value associated with each of the plurality of subgroups of functions;

subsequently receiving a request for access to the digital asset, and in response:

obtaining from a subgroup of functions current-live sensitive data in real-time from a current user context, creating a decryption key wherein bits of the decryption key are derived from the coefficients of a polynomial, wherein the coefficients are regenerated from both the stored Y-values and current-live sensitive data, wherein the current-live sensitive data is sourced from a subgroup of functions from the plurality of subgroups; and decrypting the digital asset with the decryption key, derived from the current live sensitive security data, for access to the digital asset.

17. A digital assets server to secure and provide access to protected digital assets, with live data redundancy and without using stored sensitive security data, for decryption, the digital assets server comprising:

a processor;

a network interface communicatively coupled to the processor and to the hybrid wireless network; and a memory, communicatively coupled to the processor and storing source code, that when executed by the processor, cause the processor to:

a receive a request to protect a digital asset, and in response, defines a group of functions for initial sensitive security data collection and a plurality of distinct subgroups of functions needed for decryption, wherein the initial sensitive security data is live data retrieved in real-time from a user context, and wherein a function describes a live data requirement that is converted to an X value upon collection, wherein the encryption creates an encryption key from a first subgroup of functions from a plurality of distinct subgroups of functions, wherein the plurality of distinct subgroups are each selected from the group of functions, wherein the encryption encrypts the digital asset with the encryption key of the first subgroup of functions using the live sensitive data, for storage, wherein the encryption generates a polynomial, wherein coefficients to the polynomial are derived from bits of the encryption key, wherein the encryption calculates Y values as solutions to the polynomial, by using a plurality of distinct X values from the plurality of distinct subgroups of functions using the live sensitive data including the first subgroup of functions, and wherein the encryption deletes the encryption key and the live sensitive data, and stores identifiers of the plurality of subgroups of functions and a Y value associated with each of the subgroups of functions;

wherein the monitoring subsequently receives a request for access to the digital asset, and in response, the decryption module obtains from a subgroup of functions current-live sensitive data in real-time from a current user context, wherein the encryption creates a decryption key
wherein bits of the decryption key are derived
from the coefficients of a polynomial, wherein the
coefficients are regenerated from both the stored
Y-values and the current-live sensitive data from a
subgroup of functions from the plurality of sub-
groups, and wherein the decryption decrypts the digital asset with
the decryption key, derived from current sensitive
security data for access to the digital asset.

\* \* \* \* \*